P. C. EWART.
Car-Coupling.

No. 214,763.  Patented April 29, 1879.

P. C. EWART.
Car-Coupling.

No. 214,763. Patented April 29, 1879.

Attest.
M. M. Converse.
Mary Bradwell.

Inventor:
Philo C. Ewart.
By B. C. Converse, Atty.

UNITED STATES PATENT OFFICE.

PHILO C. EWART, OF SPRINGFIELD, OHIO.

IMPROVEMENT IN CAR-COUPLINGS.

Specification forming part of Letters Patent No. 214,763, dated April 29, 1879; application filed March 8, 1879.

*To all whom it may concern:*

Be it known that I, PHILO C. EWART, of the city of Springfield, in the county of Clarke and State of Ohio, have invented certain new and useful Improvements in Car-Couplings, of which the following is a full, clear, concise, and exact specification, reference being had to the drawings hereto annexed, in which—

Figure 1:
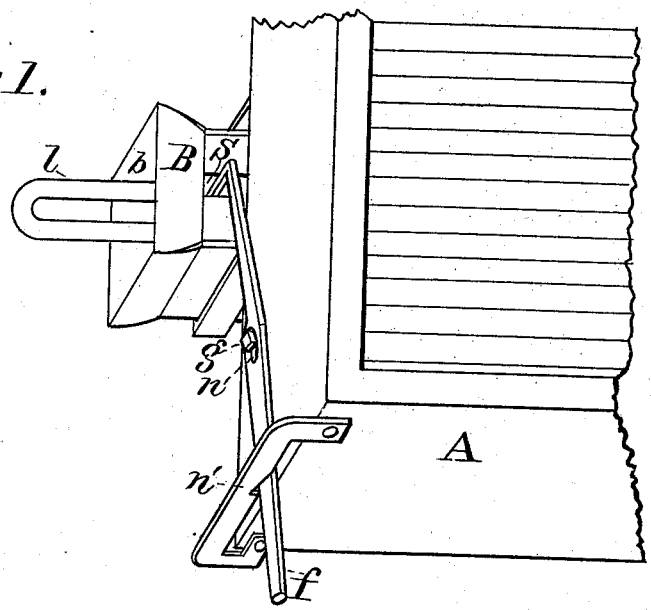
Figure 2:
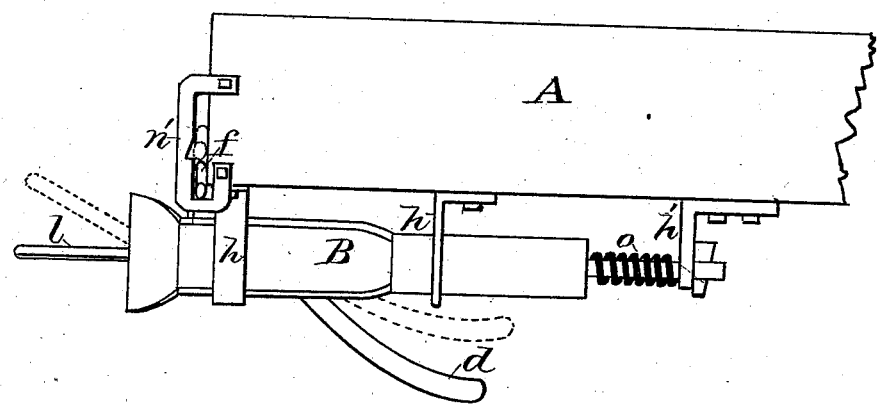
Figure 3:
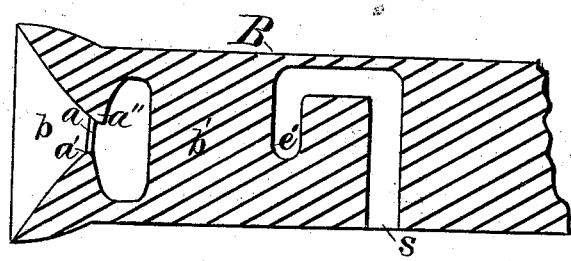
Figure 4:
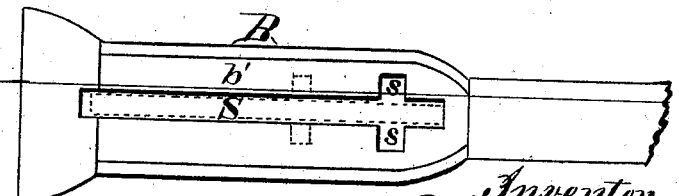
Figure 5:
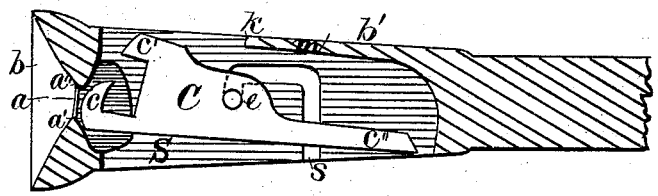
Figure 6:
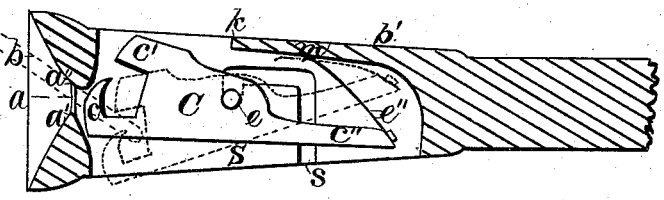
Figure 7:
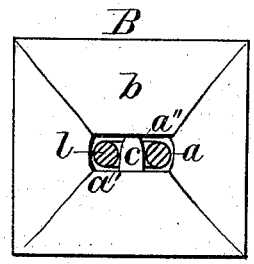
Figure 8:
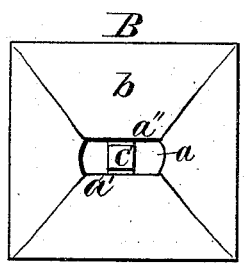

Figure 1 is an end section of a platform-car to which my improvements are applied, the view being isometric. Fig. 2 is a side elevation of an end section of a car with my draw-bar and coupling. Fig. 3 is a longitudinal section of the front half of the draw-bar through line *x*, Fig. 4. Fig. 4 is a view of the under side of the draw-bar, with the coupling in dotted lines. Fig. 5, Sheet 2, is a longitudinal sectional view of the draw-bar, with the short coupling-lever therein. Fig. 6 is a similar view with the coupling hook and link shown in two positions, one being in dotted lines to show the manner of throwing up the link in coupling with higher cars. Figs. 7 and 8 show the mouth of the draw-bar, with the coupling-hook as attached and as disconnected from the link.

My improvement relates to that class of car-couplings called "safety-coupling;" and consists of a draw-bar of peculiar construction, having within it a pivoted lever armed at the front end with a hook for connecting it by a link with the opposite draw-bar, which is of exactly similar construction. The hook end of the lever is much the heaviest, and is necessarily held in its proper position by either a counter-weight formed by a rear extension behind its pivot-bolt or by a spring or other equivalent. The lever and its hook are made detachable, in order to facilitate repairs. Besides the hook for catching and holding the link, the head of the lever above it is formed with a projecting end, for manipulating the link and to aid in retaining at any angle desired when coupling cars having draw-bars of uneven height.

The object of my invention is a railroad-car coupling which can be coupled and uncoupled without requiring the necessity of the coupler going between the cars to guide the link into the draw-bar or to insert a pin; also, to have the hook-lever easily detached from the draw-bar and readily inserted therein.

The main features of my improvement consist in a draw-bar having a peculiar-shaped throat, and an extended vertical slot in the body, with right-angled hook-shaped grooves on either side of the slot, for the introduction of a detachable hook-lever having short fixed journals thereon, and for retaining the same in an operative position when inserted. The hook-lever is pivoted, about the center of the draw-bar, horizontally, in the ends of the hook-shaped grooves, so as to allow an up-and-down motion at either end. The hook is so situated in the front end of the vertical slot of the draw-bar, near its head, that it can be manipulated by the aid of a hand-lever extending horizontally from it to the outside of the cars, to give the link any desired angle of elevation or depression up to thirty degrees. The same lever is used to lower the hook to detach the link.

My improved coupling will readily connect with any other in which the link is used.

In the drawings, Figs. 1 and 2, A represents a corner section of the left end of a freight (coal) car. B is the draw-bar, which is hung in hangers $h$ and $h'$, in the usual manner. $b$ is the mouth, which is flared out; but the upper angle of the throat, $a''$, is farther back in the mouth than the lower angle, $a'$. By reference to Figs. 3, 5, and 6, it will be seen that these angles are not opposite to each other. The object of this difference is to allow the point of the hook $c$ to strike the upper angle, $a''$, when in position for receiving the end of an inserted link, which will pass up the front slope of the hook to the inner angle which the point makes with $a''$, and the hook being forced down the end of the link will readily enter over its point, and the hook will rise up into it. Back of the throat-opening $a$ the head is recessed out upward and downward to give room for the inner end of the link $l$ when its outer end is elevated or depressed. These recesses slope off into the main slot S, forming the rear faces of the angles $a'$ and $a''$.

It will be readily seen that the angle $a'$ below must be forward of the vertical line of $a''$ above, in order to allow the hook $c$ to pass it when thrown up to $a''$, as described. (See Fig. 6.) When the outer end of the link is raised the hook $c$ falls below the throat $a$, and the jaw $c'$ comes in contact with its inner end, tilting it on the angle $a'$.

The slot S is cut through the body $b'$ of the draw-bar vertically from the head back to the point $k$. From this point back to the rear it is cut out from the under side, leaving the part $m$ over the rear half of the slot. This forms a bearing for a spring, $e''$, when used.

The object in cutting the slot S through back of the head of the draw-bar is to accommodate the movements of the head or hook end of C, as will be seen by reference to Fig. 6, where its change of position is shown in dotted lines.

By reference to Figs. 3, 4, 5, and 6, the right-angled hook-shaped grooves $s$ will be noticed extending from the under side of the bar upward, forward, and downward, terminating at the point $e'$, Fig. 3. These grooves are cut in the inner faces of the slot S on each side, opposite to each other, (see Fig. 4,) their object being for the reception of the short journals $e$ on each side of the hook-lever C, which traverse the grooves when the lever is inserted, and rest in their ends $e'$ when it is in position, as seen in Figs. 5 and 6. The insertion and removal being made from the under side, as shown in Fig. 4, the journals $e$ of the hook-lever dropping down into ends $e'$ of these grooves causes it to be retained in its position, and at the same time allowing it to be detachable.

The hook-lever is flat, and widens from the pivots or journals $e$ forward to the front end, the upper angle of which is formed into a projecting jaw, $c'$, the lower angle or point of which slightly overhangs the point of the hook $c$ when the lever is in a horizontal position. The hook $c$ on the lower front angle of the head of hook-lever C extends forward of the jaw $c'$, and is turned upward and backward from the end of its stem, (which is a horizontal prolongation of the lower part of the head,) so as to receive and retain the link $l$ when in its normal position. (See Figs. 5 and 6.)

When the head of lever C is thrown down by the hand-lever $f$, Figs. 1, 2, and 6, for the purpose of elevating the outer end of the link $l$, the jaw $c'$ bears down the inner end, and being pivoted on the lower angle, $a'$, of the throat $a$, the outer end can be elevated to any required height. As soon as it is caught in the opposite draw-bar, the hook-lever resumes its normal position automatically by either the counter-weight $d$ or the spring $e''$ operating on the arm $c''$ in rear of its journals. This resume movement is facilitated by the inner end of the link pressing upward on the under side of the jaw $c'$ as its outer end enters the mouth and throat of the connecting draw-bar. In detaching the link $l$ the head of C is thrown down just far enough to bring the opening between the jaw $c'$ and the point of its hook $c$ opposite to the throat-hole $a$.

It will be observed that the part of hook-lever C forward of its journals is very heavy, and that it requires a rearward extension or counter-weight, $d$, or a spring, $e''$, or its equivalent, to retain it in a horizontal position.

In Fig. 2 an extended arm, $d$, is shown, and in Fig. 6 the plain slightly-curved spring $e''$ on the short arm $c''$ is seen. As shown, it is fastened at the lower end by a screw-bolt to the end of the arm, (which is beveled at the proper angle,) and extends upward and forward until the top end bears against the under surface of the part $m$.

Besides the two modes of producing the automatic movement of the hook-lever C described, two other applications of springs could be used to produce like results: First, a spiral spring could be set upon the rear of the short lever $c''$, having its upper end bearing against the under surface of the part $m$; second, a straight flat spring could be fastened on the under side of the body of the draw-bar, extending from the rear end (over the slot S) forward, and curved slightly upward, so as to have its free end bear against the under surface of the head, near the hook $c$. Either of these appliances could be used; but in the latter case the hook-lever C could not be detached without first removing the spring.

The hand-lever $f$ has an elongated slot, $n$, through which it is pivoted to the end of the car A by bolt $g$. Its forward end is bent down at nearly right angles, so as to enter the slot S, (near the head of the draw-bar,) and rests on the top of the jaw $c'$. The handle end of this lever extends out beyond the side of the car through the bracket $n'$, which is bolted to the outside of the corner of the car, and is provided with a notch for retaining the lever in a position to hold the link horizontally, as seen in Figs. 1 and 2, or for inserting a link from an opposite draw-bar, the hook being sloped or curved back on its front face, so as to easily allow the insertion of the link without the necessity of manipulating the lever $f$ in the receiving draw-bar.

I am aware that many forms of automatic or safety coupling have been used; but in most instances these have been too complicated to be practical, and too easily got out of order to remain in use. Cheapness of construction, simplicity, and effectiveness in operation are advantages essential for the purpose, besides readiness of removal of the operative parts for repairs.

I claim as my improvement—

1. In an automatic or safety coupling for cars, a draw-bar, B, having a vertical longitudinal slot, S, open from the head back to the point $k$, thence to the rear end of its body $b'$, cut out from the under side, so as to leave the part $m$ closed at the top, and provided with the right-angled hook-shaped grooves $s$, extending from the lower part of the slot S upward, forward, and downward in each of its opposite faces to the point $e'$, at or near the center of the same, for receiving the hook-lever C, pivoted therein, and allowing its ready removal when required, substantially as and for the purpose hereinbefore set forth.

2. In an automatic coupling for cars, a draw-bar, B, constructed substantially as shown and described, and a hook-lever, C, centrally pivoted therein, having its head gradually widened from the journals $e$ forward, and provided at the front end with a hook, $c$, and a projecting jaw, $c'$, for connecting with, and disconnecting from, the link of an opposite draw-bar, substantially as hereinbefore set forth.

3. The coupling or hook lever C, having its head provided with a hook, $c$, for catching and retaining the link, and a projecting jaw, $c'$, by which said link is elevated, depressed, or held in a horizontal position, as described, the short fixed journals $e$, and a rear-extended arm or counter-weight, $d$, the whole formed in a single piece, centrally pivoted within the body $b'$ of the draw-bar B, detachable therefrom by means of the hook-shaped grooves $s$ in each side of the longitudinal slot S, as set forth, and adapted to be operated by the lever $f$ from the outside of the car, substantially as and for the purpose hereinbefore specified.

4. In an automatic coupling for cars, constructed of the two parts B and C, arranged and operated substantially as set forth, a spring, $e''$, or its equivalent, attached to the arm $c''$ at or near the end of the same, for the purpose of causing the pivoted hook-lever C to return to its horizontal position when thrown downward by the hand-lever $f$, or the insertion of a link therein, substantially as set forth.

5. In combination with the draw-bar B, the pivoted hook-lever C, having hook $c$ and jaw $c'$, link $l$, hand-lever $f$, slotted and pivoted as described, bracket $n'$, and car A, as and for the purpose set forth.

6. In an automatic coupling for cars, consisting of a draw-bar, B, having the longitudinal slot S extending from front to rear of its body $b'$, substantially as described, the hook-shaped grooves $s$, cut in the opposite faces of said slot, beginning at the under surface of the draw-bar, and extending upward, forward, and downward, and terminating about the horizontal center of said draw-bar, as set forth, for the purpose of allowing a hook-lever coupling or other connection pivoted therein to be insertible, operative, and detachable, as hereinbefore set forth, for the purpose specified.

PHILO C. EWART.

Attest:
B. C. CONVERSE,
M. M. CONVERSE.